United States Patent
Ganschow et al.

(10) Patent No.: US 7,695,558 B2
(45) Date of Patent: Apr. 13, 2010

(54) DIKETOPYRROLOPYRROLE PIGMENTS HAVING HEIGHTENED FASTNESSES AND PROCESSES FOR PREPARING THEM

(75) Inventors: Matthias Ganschow, Wiesbaden (DE); Christiane Strohm-Zimmermann, Wiesbaden (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 12/224,078

(22) PCT Filed: Jan. 17, 2007

(86) PCT No.: PCT/EP2007/000359
§ 371 (c)(1), (2), (4) Date: Aug. 15, 2008

(87) PCT Pub. No.: WO2007/093260
PCT Pub. Date: Aug. 23, 2007

(65) Prior Publication Data
US 2009/0084286 A1    Apr. 2, 2009

(30) Foreign Application Priority Data
Feb. 18, 2006  (DE) .................. 10 2006 007 621

(51) Int. Cl.
C09B 67/20 (2006.01)
C09B 67/02 (2006.01)
C09B 67/10 (2006.01)

(52) U.S. Cl. ............... 106/498; 106/31.77; 47/57.6; 430/108.23; 524/105

(58) Field of Classification Search ............ 106/31.77, 106/498; 47/57.6; 430/108.23; 524/105
See application file for complete search history.

(56) References Cited

U.S. PATENT DOCUMENTS

| 3,267,041 | A | 8/1966 | MacCullum |
| 4,579,949 | A | 4/1986 | Rochat et al. |
| 4,778,899 | A | 10/1988 | Pfenninger et al. |
| 5,095,122 | A * | 3/1992 | Bugnon et al. ............ 548/453 |
| 6,409,816 | B1 | 6/2002 | Weber et al. |
| 6,566,519 | B2 * | 5/2003 | Nickel et al. ............ 544/336 |
| 6,723,138 | B2 * | 4/2004 | Nickel et al. ............ 8/637.1 |
| 7,002,021 | B2 | 2/2006 | Grimm et al. |
| 7,045,637 | B2 | 5/2006 | Weber et al. |
| 7,045,638 | B2 | 5/2006 | Weber et al. |
| 7,102,014 | B2 | 9/2006 | Weber et al. |
| 7,153,358 | B2 * | 12/2006 | Weber et al. ............ 106/498 |
| 7,279,514 | B2 * | 10/2007 | Lenz et al. ............ 524/92 |
| 7,417,154 | B2 * | 8/2008 | Wallquist et al. ............ 548/453 |
| 2006/0246023 | A1 * | 11/2006 | Kaul ............ 424/63 |
| 2008/0287689 | A1 * | 11/2008 | Wallquist et al. ............ 548/453 |

FOREIGN PATENT DOCUMENTS

| DE | 102006007622 A1 * | 8/2007 |
| EP | 0094911 | 11/1983 |
| EP | 0184982 | 6/1986 |
| EP | 072063 | 3/1996 |
| EP | 1101800 | 5/2001 |
| JP | 2007224177 A * | 9/2007 |

OTHER PUBLICATIONS

English Translation of IPER for PCT/EP2007/000359 mailed Oct. 23, 2008.
PCT International Search Report for PCT/EP2007/000359, mailed Oct. 11, 2007.
Wallquist O: "Diketopyrrolopyrrole (DDP) Pigments" High Performance Pigments, Wiley-VCH, DE XP 009088835, pp. 159-183 (2002).

* cited by examiner

*Primary Examiner*—Anthony J Green
(74) *Attorney, Agent, or Firm*—Anthony A. Bisulca

(57) ABSTRACT

The invention relates to a diketopyrrolopyrrole pigment of formula (I)

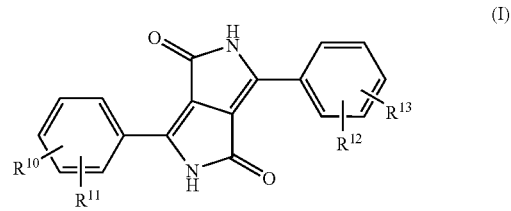

in which $R^{10}$, $R^{11}$, $R^{12}$ and $R^{13}$ independently of one another denote hydrogen, halogen, $C_1$-$C_4$-alkyl, $C_1$-$C_4$-alkoxy, cyano or phenyl, characterized by a first maximum of the frequency distribution (according to weight fractions) of the crystal sizes at or below 700 nm and at least one further maximum of the frequency distribution (according to weight fractions) of the crystal sizes which is at least 100 nm above the first maximum.

17 Claims, No Drawings

DIKETOPYRROLOPYRROLE PIGMENTS HAVING HEIGHTENED FASTNESSES AND PROCESSES FOR PREPARING THEM

The present invention relates to novel diketopyrrolopyrrole pigments of high purity and high light- and weatherfastness that are characterized by a certain particle size distribution.

1,4-Diketopyrrolo[3,4-c]pyrrole pigments are well known and are described in EP-A-0 094 911 for example.

Diketopyrrolopyrrole pigments generally display very good stabilities in the application media and light- and weatherfastnesses. Yet when P.R. 254 for example is used in the injection molding pigmentation of polyamides this pigment is observed to undergo very severe degradation during the pigmenting step. Some high-fastness applications therefore make it desirable to use pigments having higher light- and weatherfastnesses and thermal stabilities. Switching from one diketopyrrolopyrrole pigment used to a pigment of another class that has higher fastnesses and thermal stabilities leads in most cases to a severe change in the color characteristics and the other performance characteristics. The diketopyrrolopyrrole pigments' good dispersibility, high color strengths and clean hues are difficult to emulate with other pigments. It has therefore hitherto been the case that the DPP pigments' slightly worse light- and weatherfastnesses have come to be accepted given the other, very good performance characteristics.

It is an object of the present invention to develop a diketopyrrolopyrrole pigment having enhanced light- and weatherfastnesses coupled with unchanged color and performance characteristics.

We have found that this object is achieved, surprisingly, by the pigments described hereinbelow.

The present invention accordingly provides a diketopyrrolopyrrole pigment of formula (I)

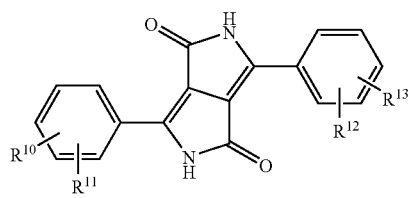

(I)

where $R^{10}$, $R^{11}$, $R^{12}$ and $R^{13}$ are independently hydrogen, halogen, for example chlorine or bromine, $C_1$-$C_4$-alkyl, for example methyl, ethyl or tert-butyl, $C_1$-$C_4$-alkoxy, for example methoxy, cyano or phenyl, characterized by a first maximum of the frequency distribution (by weight) of the crystal sizes at or below 700 nm and at, least one further maximum of the frequency distribution (by weight) of the crystal sizes that is at least 100 nm above the first maximum.

It is particularly preferable when $R^{11}$ and $R^{13}$ are each hydrogen, and $R^{10}$ and $R^{12}$ are the same or different and are each hydrogen, methyl, tert-butyl, chlorine, cyano or phenyl.

Examples of preferred pigments are C.I. Pigment Orange 71, 73, 81, Pigment Red 254, 255, 264, 270 and 272.

The pigment of the present invention is characterized in that the frequency distribution of the crystal sizes is not monomodal, but has a plurality of maxima, preferably is bimodal (two maxima in the frequency distribution).

Preference is given to particle size distributions having a maximum of the frequency distribution at less than 700 nm (smaller particle variety) and at least one further maximum greater by 200 nm and especially a further maximum greater by 300 nm (larger particle variety).

The maximum of the frequency distribution of the smaller particle variety is preferably between 100 and 700 nm and is especially between 200 and 600 nm.

The particles of the first distribution peak, i.e., the smaller particle variety, accounts for more than 20% by weight, preferably more than 50% by weight and especially more than 70% by weight of the total particles in this pigment.

When the two maxima of the frequency distribution are close to each other and/or have very different sizes, one of the two maxima often does not have the shape of a pronounced peak, but is only identifiable as a shoulder. For consistency herein, even a shoulder will be referred to as a maximum.

The diketopyrrolopyrrole chromophore can be synthesized using known processes. In this case, appropriately substituted nitrites can be reacted similarly to the process described in EP-A-0 094 911 with succinic diesters and strong bases in an organic solvent in the presence of a strong base and at elevated temperature. Alternatively, it is also possible for an appropriately substituted lactam or enamine to be reacted in an organic solvent in the presence of a strong base at elevated temperature (EP-A-0 184 982).

The as-synthesized disodium salt of the pigment is converted into the pigment by hydrolysis. Thereafter, the finely divided pigment thus obtained is brought into the bimodal form of the present invention by a pigment-finishing (conditioning) operation which is in accordance with the present invention.

The present invention accordingly also provides a process for producing the diketopyrrolopyrrole pigment of the present invention, by reaction of 1 mol of a dicyclohexyl succinate, dialkyl succinate, monoalkyl monophenyl succinate or diphenyl succinate ester in which alkyl in the succinyl radical is $C_1$-$C_{18}$-alkyl and phenyl in the succinyl radical is unsubstituted phenyl or phenyl substituted by one or two $C_1$-$C_6$-alkyl or $C_1$-$C_6$-alkoxy groups, with 2 mol of a mixture of nitrites of the formulae $R^{10}R^{11}C_6H_3$—CN and $R^{12}R^{13}C_6H_3$—CN, where $R^{10}$, $R^{11}$, $R^{12}$ and $R^{13}$ are each as defined above, the molar ratio between $R^{10}R^{11}C_6H_3$—CN and $R^{12}R^{13}C_6H_3$—CN in the nitrile mixture being in the range from 100:0 to 50:50; or by reaction of 1 mol of a lactam of formula (II) or of an enamine of formula (III)

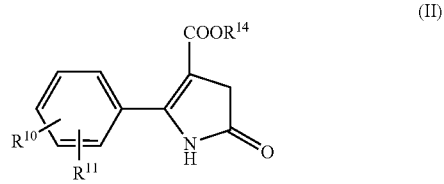

(II)

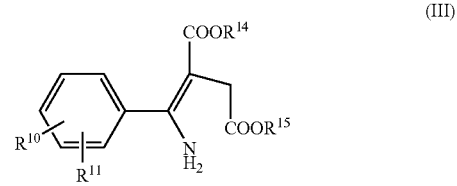

(III)

with one mole of a nitrile of the formula $R^{12}R^{13}C_6H_3$—CN, where $R^{10}$, $R^{11}$, $R^{12}$ and $R^{13}$ are each as defined above and $R^{14}$ and $R^{15}$ are each alkyl or aryl, preferably $C_1$-$C_{11}$-alkyl or $C_6$-$C_{10}$-aryl;

in an inert organic solvent in the presence of an alkali metal or of an alkali metal alkoxide as a strong base at elevated temperature to form a pigment alkali metal salt and subsequent release of a compound of formula (I) by protonation of the resulting pigment alkali metal salt and subsequent conditioning, characterized in that the conditioning is carried out in a solvent at a temperature of at least 80° C. in the presence of 0.1% to 10% by weight, preferably 0.2% to 9% by weight and especially 0.3% to 8% by weight of seed crystals of a compound of formula (I), based on the theoretical yield of pigment without seed crystals.

The seed crystals added for conditioning can be prepared by the abovementioned known processes. The seed crystals of formula (I) advantageously correspond to the chemical constitution of the pigment of formula (I) to be produced.

The maximum of the frequency distribution of the seed crystals is advantageously between 100 and 1000 nm, but usually between 150 and 800 nm, and preferably 200 to 600 nm.

Preference is given to using such solvents as boil above 80° C. Of particular suitability are halogen-, alkyl- or nitro-substituted benzenes, such as xylenes, chlorobenzene, o-dichlorobenzene or nitrobenzene, and also pyridine bases, such as pyridine, picoline or quinoline, ketones such as cyclohexanone, ethers, such as ethylene glycol monomethyl ether, ethylene glycol monoethyl ether or the corresponding dialkyl ethers, amides, such as dimethylformamide or N-methylpyrrolidone, and also dimethyl sulfoxide, sulfolane or high-boiling alcohols, such as amyl alcohol or isobutanol or water alone, if appropriate under superatmospheric pressure. The pigment-finishing operation can also be carried out in water in the presence of organic solvents and/or with admixture of surface-active substances. Particular preference is given to high-boiling alcohols, such as isobutanol or amyl alcohol and their mixtures with water.

The conditioning is preferably conducted at temperatures between 80 and 180° C., especially between 90 and 150° C. and more preferably between 110 and 140° C. To ensure adequate crystal growth, conditioning should be done for at least 30 min, preferably 1.5 to 24 h and especially 2 to 10 h.

Conditioning can be done at different pH values, but preferably at above pH 8.

The seed crystals can be added directly before or during the hydrolysis of the as-synthesized pigment alkali metal salt to the precipitation medium, or only before the start or else during conditioning, in one or more portions. The seed crystals can be employed as a dry powder or as a moist presscake.

Auxiliaries, for example surfactants, pigmentary and non-pigmentary dispersants, shading colorants or rheology control additives can be used before or after conditioning. The pigments thus treated are then generally dried and end-itemed in accordance with the planned use.

The pigments of the present invention are useful for pigmentation of high molecular weight organic materials of natural or synthetic origin, for example of plastics, resins, coatings, paints, printing inks, inkjet inks, in particular for the "wide format" sector, powder coatings, electrophotographic toners and developers and seed. Their use is particularly preferred in the outdoors sector, where a high light- and weatherfastness is desirable.

EXAMPLES

To determine the frequency distribution of the crystalline particles, the pigments obtained were fully dispersed in an alkyd-melamine varnish system and the frequency distribution in the varnish system was determined by means of a disc centrifuge.

Measuring Apparatus:

The measurements were carried out using DC24000 and DC20000 disc centrifuges from CPS Instruments, Inc., Stuart, Fla. 34997, USA.

Making of Coatings:

The coatings were produced as follows: 7.2 g of pigment and 22.8 g of alkyd-melamine grind varnish (1) were dispersed together in a DAS 200 K disperser, for 30 min.

After dispersion, 60 g of alkyd-melamine letdown mix (2) were added and dispersing in the DAS 200 K disperser was continued for a further 3 min. The glass beads were separated off and the millbase was diluted with a mixture of 75 g of xylene and 25 g of coating base in 2 stages to a total of 1:300 and was bath ultrasonicated for 120 sec.

The composition of the coatings mentioned is as follows:

| (1) | Alkyd-melamine grind varnish 35%: | |
| --- | --- | --- |
| | Vialkyd AC 451n/70SNB (UCB Resins and Additives) | 50.0 g |
| | Solvent Naphtha, Ie | 50.0 g |
| (2) | Alkyd-melamine letdown mix 55.8%: | |
| | Vialkyd AC 451n/70SNB (UCB Resins and Additives) | 26.4 g |
| | Vialkyd AC 451/60SNA (UCB Resins and Additives) | 29.4 g |
| | Maprenal MF600/55BIB (UCB Resins and Additives) | 35.8 g |
| | alkyd-melamine high-boiling mix | 6.2 g |
| | Solvent Naphtha, Ie | 2.2 g |
| (3) | Alkyd-melamine high-boiler mix: | |
| | n-butanol | 35.0 g |
| | Depanol I | 35.0 g |
| | butyl diglycol | 30.0 g |
| (4) | Coating base | |
| | alkyd-melamine grind varnish (1) | 300.0 g |
| | alkyd-melamine letdown mix (2) | 600.0 g |

Production of Density Gradient:

To obtain stable sedimentation characteristics, a density gradient was established in the spin fluid of the disc centrifuge. The density gradient was established by mixing 40% to 60% by weight of xylene with the abovementioned coating base.

Conduct of Measurement and Evaluation:

Following attainment of the nominal speed of 16000 $\min^{-1}$ charge 15 ml of spin fluid with density gradient in the centrifuge disc. Inject 0.1 ml sample. Record the sedimentation curve and use the CPS software to calculate the particle size volume distribution. Correct evaluation taking into account Mie theory requires the complex refractive index of the pigment. It was determined for 2 samples by ellipsometry on pressed tablets at L.O.T. Oriel GmbH of Darmstadt. The similarly required density of the pigment particles was determined using a Micromeritics AccuPyc 1330 gas pyknometer.

Example 1a

Production of Seed Crystals

C.I. Pigment Red 254 is produced by reacting 30 parts of p-chlorobenzonitrile similarly to the method described in EP-A-0 094 911 for Examples 15-37 with 29.5 parts of diisopropyl succinate and 30% sodium amoxide (prepared from 9.3 parts of sodium and 143 parts of amyl alcohol) as base.

The thereby obtained disodium salt of the pigment is converted into the pigment by hydrolysis of the hot disodium salt suspension at 80° C. by pouring onto warm neutral water at 40° C. This is followed for conditioning by a pressure finish of the resulting amyl-alcoholic/aqueous pigment hydrolysis suspension at about 120° C. for 5 h.

Isolation and washing with methanol and water gives a P.Red 254 whose monomodal frequency distribution has a maximum at 340 nm.

Example 1b

Production of Seed Crystals

Example 1a is repeated except that the pressure finish is carried out at 100° C. The monomodal frequency distribution of the P.Red 254 obtained has a maximum at 294 nm.

Example 2

Example 1a is repeated except that 0.3% by weight (based on the yield achieved in Example 1a) of P.R. 254 crystals from Example 1a is added to the pressure finish and the finish is carried out at 125° C. Isolation and washing leaves a pigment whose bimodal particle size distribution has one maximum at 390 nm and a further maximum at 930 nm. The particles of the distribution peak at 390 nm account for about 92% by weight of the pigment and the particles of the distribution peak at 930 nm account for about 8% by weight of the pigment.

Example 3

Example 1a is repeated except that 3.3% by weight (based on the yield achieved in Example 1a) of P.R. 254 crystals from Example 1a is added to the pressure finish and the finish is carried out at 135° C.

Isolation and washing leaves a pigment whose bimodal particle size distribution has one maximum at 480 nm and a further maximum at 950 nm. The particles of the distribution peak at 480 nm account for about 75% by weight of the pigment and the particles of the distribution peak at 950 nm account for about 25% by weight of the pigment.

Example 4

Example 1a is repeated except that 6.6% by weight (based on the yield achieved in Example 1a) of P.R. 254 crystals from Example 1a is added to the pressure finish and the finish is carried out at 135° C.

Isolation and washing leaves a pigment whose bimodal particle size distribution has one maximum at 470 nm and a further maximum at 970 nm. The particles of the distribution peak at 470 nm account for about 55% by weight of the pigment and the particles of the distribution peak at 970 nm account for about 45% by weight of the pigment.

Example 5

Example 1a is repeated except that 1.0% by weight (based on the yield achieved in Example 1) of P.R. 254 crystals from Example 1b is added to the pressure finish and the finish is carried out at 135° C.

Isolation and washing leaves a pigment whose bimodal particle size distribution has one maximum at 260 nm and a further maximum at 700 nm. The particles of the distribution peak at 260 nm account for about 90% by weight of the pigment and the particles of the distribution peak at 700 nm account for about 10% by weight of the pigment:

Example 6

Weatherfastness

Weatherfastnesses were determined in HDPE on the line of DIN EN ISO 4982-1 and -2:1999.

A P.Red 254 having a monomodal particle distribution whose maximum is at 290 nm gives a lower weatherfastness compared with the pigment of Example 5.

We claim:
1. A diketopyrrolopyrrole pigment of formula (I)

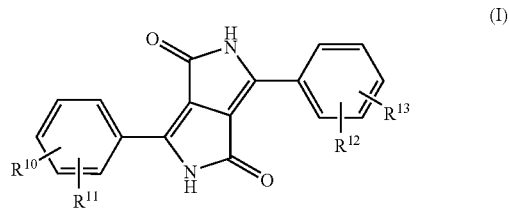

(I)

wherein
$R^{10}$, $R^{11}$, $R^{12}$ and $R^{13}$ are independently hydrogen, halogen, $C_1$-$C_4$-alkyl, $C_1$-$C_4$-alkoxy, cyano or phenyl, characterized by a first maximum of a frequency distribution, by weight, of crystal sizes at or below 700 nm and at least one further maximum of the frequency distribution, by weight of the crystal sizes that is at least 100 nm above the first maximum.

2. The pigment as claimed in claim 1, wherein
$R^{11}$ and $R^{13}$ are each hydrogen, and
$R^{10}$ and $R^{12}$ are the same or different and are each hydrogen, methyl, tert-butyl, chlorine, cyano or phenyl.

3. The pigment as claimed in claim 1, wherein the pigment is selected from the group consisting of C.I. Pigment Orange 71, 73, 81, Pigment Red 254, 255, 264, 270 and 272.

4. The pigment as claimed in claim 1, wherein the further maximum of the frequency distribution is 200 nm above the first maximum.

5. The pigment as claimed in claim 1, wherein the further maximum of the frequency distribution is 300 nm above the first maximum.

6. The pigment as claimed in claim 1, wherein the first maximum of the frequency distribution is between 100 and 700 nm.

7. The pigment as claimed in claim 1, wherein the first maximum of the frequency distribution is between 200 and 600 nm.

8. The pigment as claimed in claim 1, wherein the first maximum of the frequency distribution comprises more than 50% by weight of the total particles of the pigment.

9. A process for producing a diketopyrrolopyrrole pigment as claimed in claim 1, comprising the steps of reacting 1 mol of a dicyclohexyl succinate, dialkyl succinate, monoalkyl monophenyl succinate or diphenyl succinate ester, wherein the succinyl radical of the dialkyl succinate or the monoalkyl monophenyl succinate contains a $C_1$-$C_{18}$-alkyl and wherein the succinyl radical of the dicyclohexyl succinate, monoalkyl monophenyl succinate or diphenyl succinate ester contains a phenyl, wherein the phenyl is an unsubstituted phenyl or phenyl substituted by one or two $C_1$-$C_6$-alkyl or $C_1$-$C_6$-alkoxy groups, with 2 mol of a mixture of nitriles of the formulae $R^{10}R^{11}C_6H_3$—CN and $R^{12}R^{13}C_6H_3$—CN, wherein the molar ratio between $R^{10}R^{11}C_6H_3$—CN and $R^{12}R^{13}C_6H_3$—CN in the nitrile mixture being in the range from 100:0 to 50:50; or by reaction of 1 mol of a lactam of formula (II) or of an enamine of formula (III)

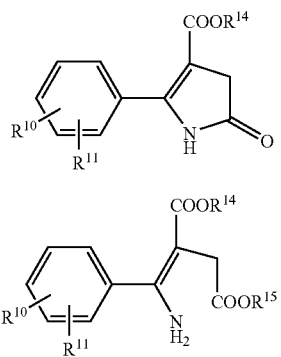

with one mole of a nitrile of the formula $R^{12}R^{13}C_6H_3$—CN, where $R^{10}$, $R^{11}$, $R^{12}$ and $R^{13}$ are each as defined above and $R^{14}$ and $R^{15}$ are each alkyl or aryl, in an inert organic solvent in the presence of an alkali metal or of an alkali metal alkoxide to form a pigment alkali metal salt, releasing the compound of formula (I) by protonation of the pigment alkali metal salt and conditioning the compound of formula (I) in a solvent at a temperature of at least 80° C. in the presence of 0.1% to 10% by weight of seed crystals of a compound of formula (I), based on a theoretical yield of pigment without seed crystals.

10. The process as claimed in claim 9, wherein the maximum of the frequency distribution of the seed crystals is between 100 and 1000 nm.

11. The process as claimed in claim 9, wherein the conditioning step is done for at least 30 minutes.

12. A pigmented high molecular weight organic materials of natural or synthetic origin pigmented by the diketopyrrolopyrrole pigment as claimed in claim 1.

13. The process as claimed in claim 9, wherein the conditioning step occurs in the presence of 0.2% to 9% of seed crystals of a compound of formula (I), based on the theoretical yield of pigment without seed crystals.

14. The process as claimed in claim 9, wherein the conditioning step occurs in the presence of 0.3% to 8% by weight of seed crystals of a compound of formula (I), based on the theoretical yield of pigment without seed crystals.

15. The process as claimed in claim 9, wherein the maximum of the frequency distribution of the seed crystals is between 150 and 800 nm.

16. The process as claimed in claim 9, wherein the maximum of the frequency distribution of the seed crystals is between 200 and 600 nm.

17. A plastic, resin, coating, paint, printing ink, electrophotographic toner, electrophotographic developer, inkjet ink or seed pigmented by the diketopyrrolopyrrole pigment as claimed in claim 1.

* * * * *